(12) United States Patent
Dehmann et al.

(10) Patent No.: US 9,336,511 B2
(45) Date of Patent: May 10, 2016

(54) IMPORT AND MERGE OF CATEGORIZATION SCHEMAS

(75) Inventors: Kai Dehmann, Wiesloch (DE); Nils Ehlert, Heidelberg (DE); Christopher Ronnewinkel, Heidelberg (DE)

(73) Assignee: SAP SE, Walldorf (DE)

(*) Notice: Subject to any disclaimer, the term of this patent is extended or adjusted under 35 U.S.C. 154(b) by 2009 days.

(21) Appl. No.: 12/336,781

(22) Filed: Dec. 17, 2008

(65) Prior Publication Data

US 2010/0088351 A1    Apr. 8, 2010

Related U.S. Application Data

(60) Provisional application No. 61/103,157, filed on Oct. 6, 2008.

(51) Int. Cl.
*G06Q 10/10* (2012.01)
*G06F 7/16* (2006.01)
*G06F 17/30* (2006.01)

(52) U.S. Cl.
CPC *G06Q 10/10* (2013.01); *G06F 7/16* (2013.01); *G06F 17/30327* (2013.01)

(58) Field of Classification Search
USPC ............... 707/797, 802, 803, 808, 999.103
See application file for complete search history.

(56) References Cited

U.S. PATENT DOCUMENTS

| | | | | |
|---|---|---|---|---|
| 2002/0184252 | A1* | 12/2002 | Holtz et al. | 707/205 |
| 2004/0193573 | A1* | 9/2004 | Meyer | 707/1 |
| 2007/0250487 | A1* | 10/2007 | Reuther | 707/3 |

* cited by examiner

*Primary Examiner* — Robert Beausoliel, Jr.
*Assistant Examiner* — Nirav K Khakhar
(74) *Attorney, Agent, or Firm* — Kenyon & Kenyon LLP

(57) ABSTRACT

Methods and systems for merging a updated schema and a customized schema both derived from the same schema are presented. The schemas may be used by application programs as decision trees. The schemas may have categories with linked business objects. The categories may be organized by a hierarchy which defines relationships between the categories. The customized schema may be imported and merged with the updated schema. The merging may be based on the merging the paths of the updated schema with the paths of the customized schema. Additional steps may include merging the attributes of the updated and customized schemas, merging the application areas of the updated and customized schemas, and merging the attributes of the categories. Adjustments may be performed to the merged updated schema by a user or an application program. The results of merging may be recorded in a log.

17 Claims, 19 Drawing Sheets

Step 3: Merging the Application Areas

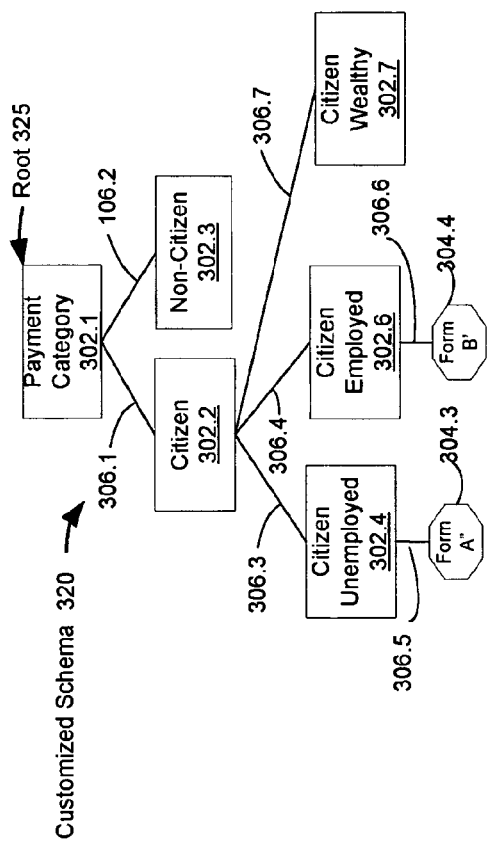
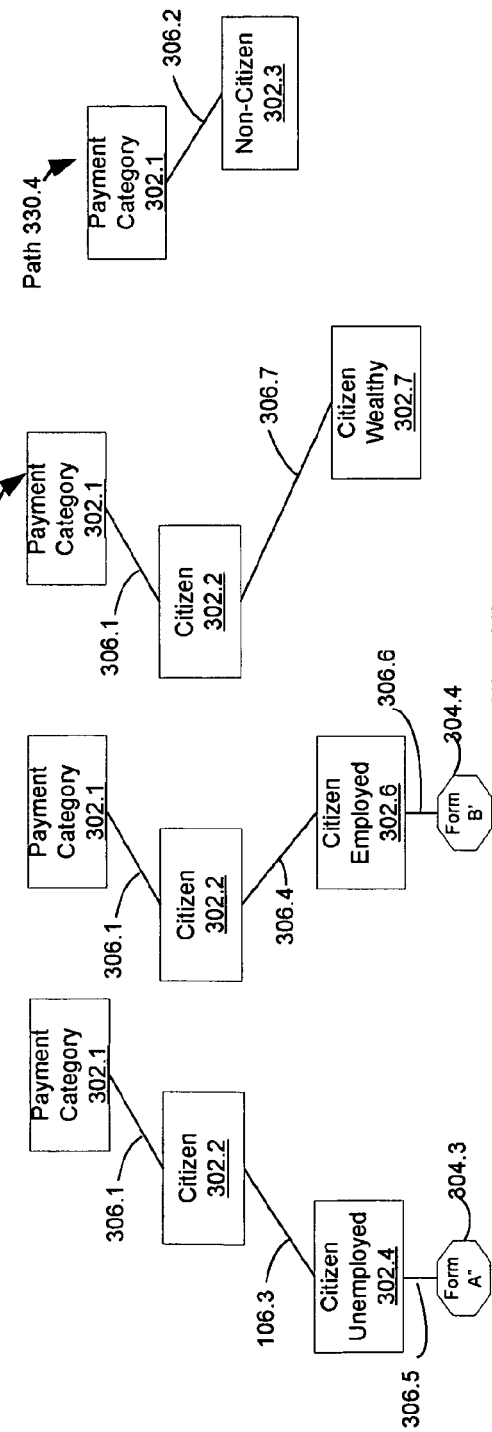
Fig. 3A
Fig. 3B

IMPORTING AND MERGING
400

Service Provider 401

- Service Provider Creating Original Schema 402
- Service Provider Sending Original Schema to Customer 404
- Service Provider Updating Original Schema to Updated Schema 410
- Service Provider Sending Updated Schema to Customer 412

Customer 403

- Customer Receiving Original Schema 406
- Customer Customizing Original Schema to Customized Schema 408
- Customer Importing Updated Schema 414
- Merging Schema B into Schema C to get Schema D 416
  - Updated Schema
  - Customized Schema
  - MERGE → Merged Schema

Fig. 4

Step 5 Second Example:
Merging the attributes of the categories

IMPORT AND MERGE OF CATEGORIZATION SCHEMAS

REFERENCE TO RELATED APPLICATION

This Application claims the benefit of U.S. Provisional Application No. 61/103,157 filed Oct. 6, 2008, the entire contents of which are incorporated herein by reference.

BACKGROUND

Software providers may use schemas to organize data. A schema is an organization of data in a hierarchy which may represent relationships between the data. Software providers may deliver software systems with schemas to their customers. The customers may need to customize the schemas to accommodate their particular needs. The software providers may continue to develop the software and update the schemas to implement improvements to the software systems. The improvements may be for many customers and may not include the customizations needed for a particular customer's needs. A problem occurs when the software provider delivers an updated software system with an updated schema to the customer with a customized schema. The software provider needs to merge the customized schema with the updated schema. However, merging the customized schema with the updated schema may be difficult because the changes to the schema to generate the customized schema and the updated schema may be inconsistent and/or because it may be prohibitively expensive to have a computer professional merge the changes manually. Manually merging the changes may be particularly expensive when the software is updated frequently and/or when highly skilled professionals are required to perform the merging.

FIG. 1A illustrates an original schema 100 which organizes different types of payment categories 102 for a hospital. A computer system (not illustrated) may use the original schema 100 to calculate a payment category 102 for a patient. The original schema 100 may be a hierarchy of categories 102 linked together with links 106. A category 102 may include additional information 104 such as forms 104.1, 104.2. In original schema 100 there are four payment categories 102.1: citizen 102.2, citizen unemployed 102.4, citizen employed 102.6, and non-citizen 102.3. The payment category 102.1 may determine a discount for billing a patient, e.g. if the patient is a non-citizen 102.3 the patient may receive no discount and have to pay 100% of the bill. The computer system may start at payment category 102.1. The computer system may then retrieve the two categories citizen 102.2, and non-citizen 102.3. The computer system may then prompt an administrative person as to whether the patient is a citizen or non-citizen. The administrative person may enter that the patient is a citizen. The computer system may then retrieve the categories citizen self-employed 102.4 and citizen employed 102.6, under citizen 102.2. The computer system may then prompt the administrative person as to whether the patient is unemployed or employed by a company. The administrative person may enter that the patient is unemployed. The computer system may then retrieve a discount percentage associated with the category citizen unemployed 102.4. For example, the patient may have to pay only 70% of the billing if the patient is a citizen and unemployed, and only 90% of the billing if the patient is a citizen and employed, but 100% of the billing if the patient is a non-citizen. The category citizen unemployed 102.4 and category citizen employed 102.6 may include respectively Form A 104.1 and Form B 104.2, which may be forms to be filled to verify that the patient is entitled to the discount received for the respective category.

FIG. 1B illustrates changes to the schema of FIG. 1A to generate a second schema 120 (hereinafter referred to as "customized schema"). The software provider may have delivered to a customer the original schema 100 of FIG. 1A. The customer may have needed to customize the original schema 100 to accommodate particular needs of the customer. For example, continuing with the example of FIG. 1A, if a particular hospital had a rule that if you were wealthy then you would receive no discount on the billing, then the original schema 100 would need to be changed to reflect this rule. In FIG. 1B, customized schema 120 is a customized version of original schema 100 with category citizen wealthy 102.7 being added. Now, when the computer system determines that the patient is a citizen 102.2, the computer system may then query an administrator as to whether or not the patient is wealthy. If the patient is wealthy, the patient may have to pay 100% of the billing. Additionally, Form A 104.1 and Form B 104.2 may have been customized to Form A" 104.3 and Form B' 104.4 to include proof that the patient is not wealthy to receive the discounted billing.

FIG. 1C illustrates changes to the original schema 100 of FIG. 1A to generate a first schema 140 (hereinafter referred to as "updated schema"). The software provider may have updated the original schema 100 to accommodate the needs of many hospitals. The changes to the original schema 100 include adding categories 102 for dependent children 102.7, 102.9, and for no children 102.8, 102.10. A hospital may now use the updated schema 140 to charge patients with dependent children 102.7, 102.9 a greater discount than patients with no children 102.8, 102.10. The updated schema 140 may include additional forms 104.

A problem occurs when updated schema 120 and customized schema 140 need to be merged to update the software system of the hospital that is using the customized second schema 120. It may be difficult to determine whether or not the two schemas 120, 140 may be merged and if they can be merged how to merge the two schemas 120, 140. Additionally, it may be labor intensive and prone to error for a skilled professional to merge the two schemas 120, 140 manually.

Therefore, there is a need in the art for methods and apparatuses to merge a customized schema and an updated schema. The customized schema and the updated schema both being changes to the same schema.

BRIEF DESCRIPTION OF THE DRAWINGS

FIG. 4 illustrates a method of importing a schema and merging the imported schema with another schema.

DETAILED DESCRIPTION

Methods and apparatuses are presented for merging an updated schema and a customized schema. Each schema may be comprised of categories organized by a hierarchy. The hierarchy may define relationships between categories. The updated schema and customized schema may be used as decision trees by a CRM application. An updated schema may be received. Each path from a root of the hierarchy of the customized schema may be compared with paths of the updated schema. If a path does not have a corresponding path in the updated schema, then the path may be added to the updated schema by adding those categories of the path of the customized schema to the updated schema that are not present in the updated schema.

An Embodiment of Merging

Figure 1A:
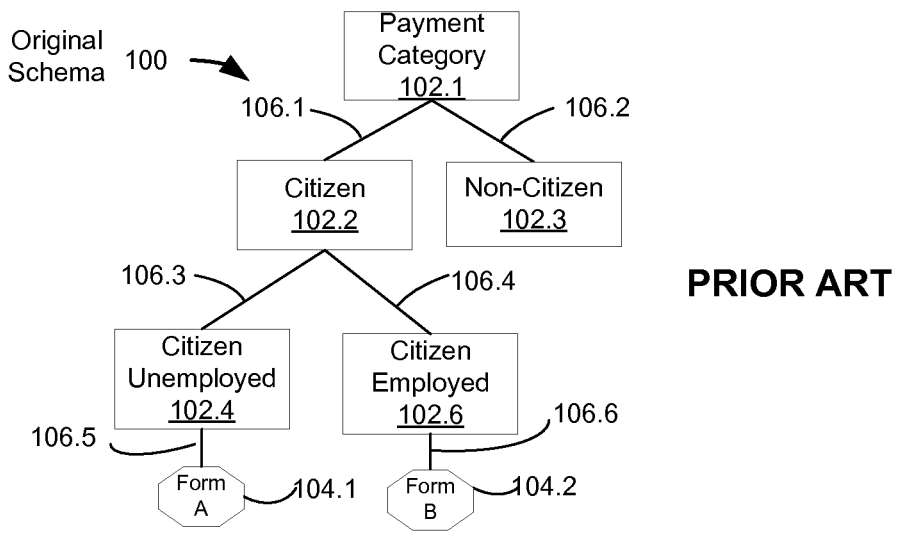
FIG. 1A illustrates a schema for billing at a hospital.
Figure 1B:
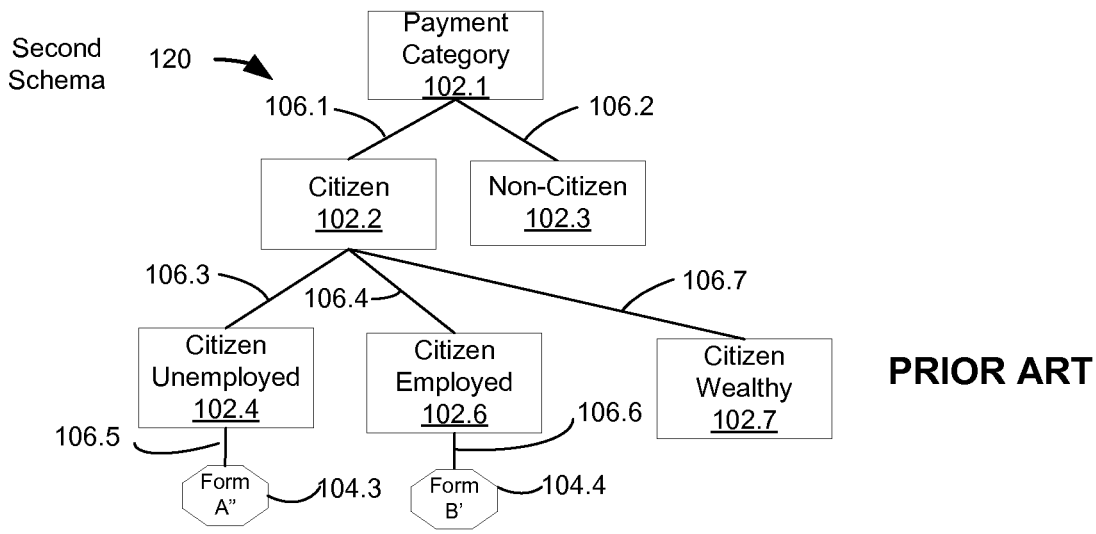
FIG. 1B illustrates a customization of the schema of FIG. 1A.
Figure 1C:
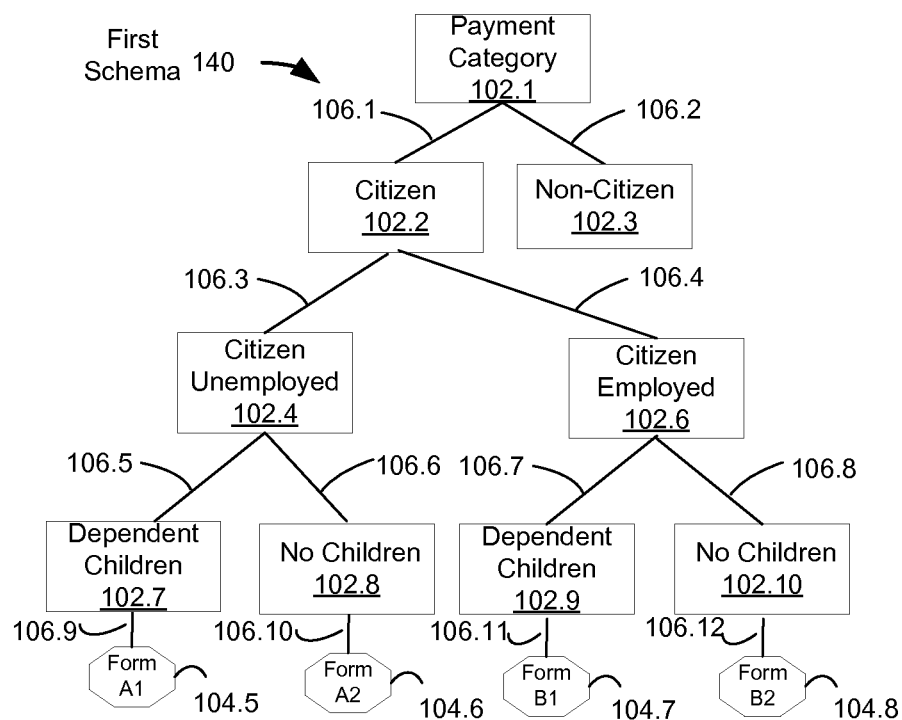
FIG. 1C illustrates an update of the schema of FIG. 1A.
Figure 2:
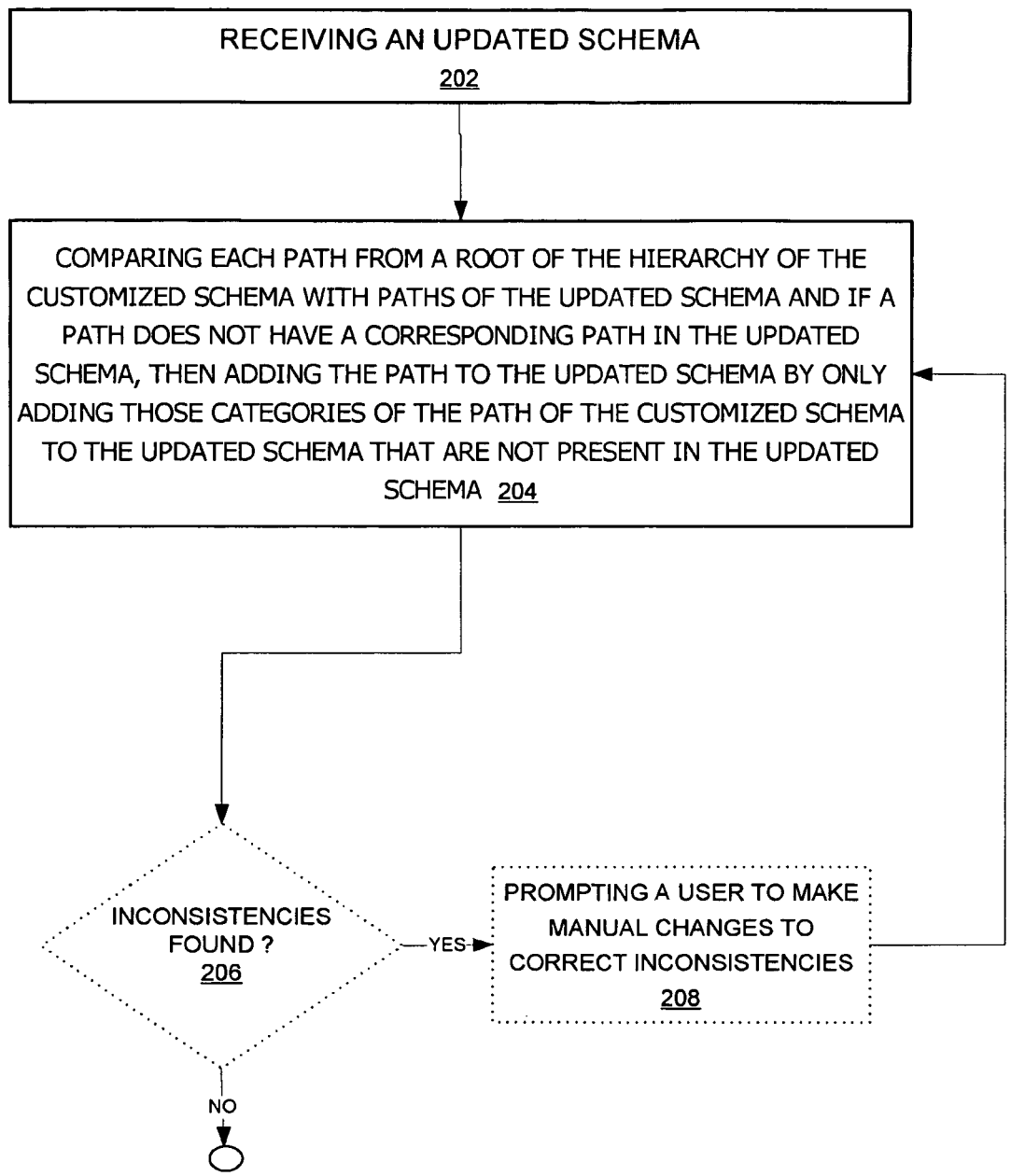
FIG. 2 illustrates a method of merging two schemas.
Figure 3C:
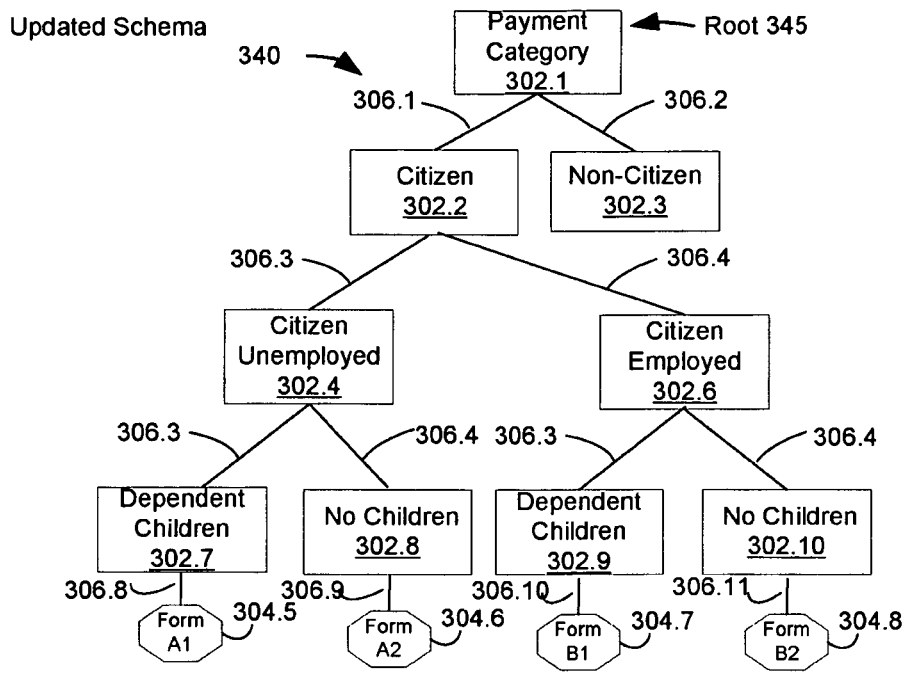
FIG. 3 illustrates merging two schemas.
Figure 3D:
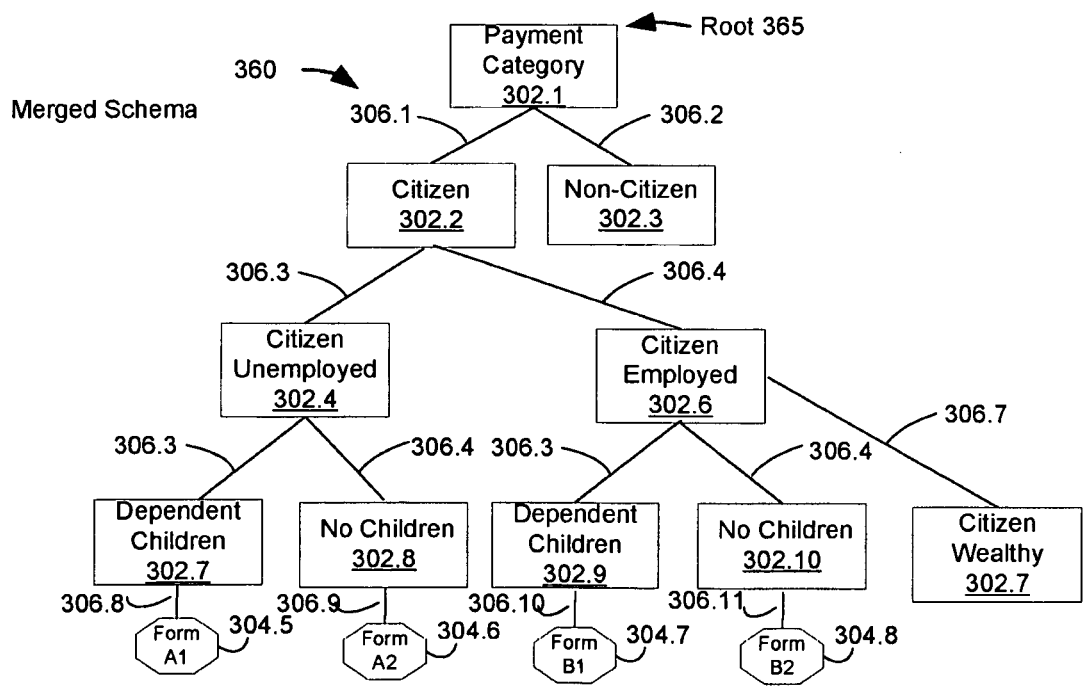

FIG. 2 illustrates a method for merging an updated schema and a customized schema. The method may begin at step 202 with receiving a updated schema. This may be a hospital receiving a schema as part of a computer system. The method may continue at step 204 with comparing each path from a root of the hierarchy of the customized schema with paths of the updated schema and if a path does not have a corresponding path in the updated schema, then adding the path to the updated schema by only adding those categories of the path of the customized schema to the updated schema that are not present in the updated schema. FIG. 3 illustrates one embodiment of merging. Customized schema 320 with root 325 (FIG. 3A) is merged with updated schema 340 with root 345 (FIG. 3C) to generate the merged updated schema 360 with root 365 (FIG. 3D). FIG. 1A illustrates the schema that was customized to generate customized schema 320 and that was updated to generate updated schema 340. The paths 330 FIG. 3B are compared with the updated schema 340 and if a path 330 does not have a corresponding path in the updated schema 340, then adding the path to the merged updated schema 365 by only adding those categories of the path of the customized schema 320 to the merged updated schema 365 that are not present in the updated schema 340. For example, the path 330.1 is compared with the updated schema 340, but since it is has a corresponding path in the updated schema 340 no new categories created. Paths 330.2 and 330.4 are similarly compared with the updated schema 340 and no new categories are created. Path 330.3 is compared with the customized schema 340 and since category citizen wealthy 302.7 is not in the updated schema 340 it is added to the merged updated schema 360. In this way, the merged updated schema 360 is generated as illustrated in FIG. 3D with each path from a root of the customized schema to each category of the customized schema preserved in the merged schema, and wherein paths with the same sequence of categories in the customized schema and the updated schema are merged into one path in the merged schema.

Optionally, the method may continue at 206 with inconsistencies found. Inconsistencies are discussed below. Optionally, if inconsistencies are found, the method may continue at 208 with prompting a user to make manual changes to correct inconsistencies. The software system may provide an editor for a user to make manual changes one of the schemas to correct inconsistencies. Optionally, the method may return to the step of comparing 208. The method may end with having generated a merged schema 360. The merged schema 360 may then include the customizations and the updates to the schema of FIG. 1A and may be used by the computer system. For example, a hospital customer relationship management system may use the merged schema 360 to calculate a patient's billing responsibility.

An Embodiment of Schemas in a Customer Relationship Management Application (CRM)

FIG. 4 illustrates an over-view of a method of importing and merging two schemas 400. The flow begins at 402 with a service provider 401, which may be a software developing company, creating original schema for a customer 403. Original schema may be part of a software system such as a billing system. The flow continues at 404 with the service provider 401 sending original schema to a customer 403. The customer 403 may be a county hospital. The flow continues at 406 with the customer 403 receiving original schema. This may be the service provider 401 installing software on the customer's computer system. The flow continues at 408 with the customer 403 customizing original schema to fit the customer's particularly needs so that original schema becomes customized schema. The flow continues at 410 with the service provider 401 updating original schema so that original schema becomes an updated schema. The service provider 401 may update original schema as part of a continuing effort to meet customers' needs with new versions of software. The flow continues at 412 with the service provider 401 sending updated schema to the customer 403. The flow continues at 414 with customer 403 importing the updated schema. The service provider 401 may send a computer readable medium which includes the updated schema, or the updated schema may be downloaded from the internet. The customer 403 may execute updates to the software that includes the updated schema. The flow continues at 416 with merging customized schema into updated schema to form a merged schema. The merged schema includes the changes to original schema made by the customer 403 (customizing original schema to customized schema) and the changes to original schema made by the service provider 401 (updating original schema to updated schema). Alternatively, a merge operation may be performed that does not alter the updated schema, but yields a new merged schema that is a copy of the updated schema. Merging updated schema and customized schema may be complicated because customized schema and updated schema may have different attributes and may be used by many software programs. Alternatively, customized schema could be sent to the service provider 401 and merged with the updated schema on the service provider's computer system, and then the merged schema may be sent to the customer 403.

Figure 5:
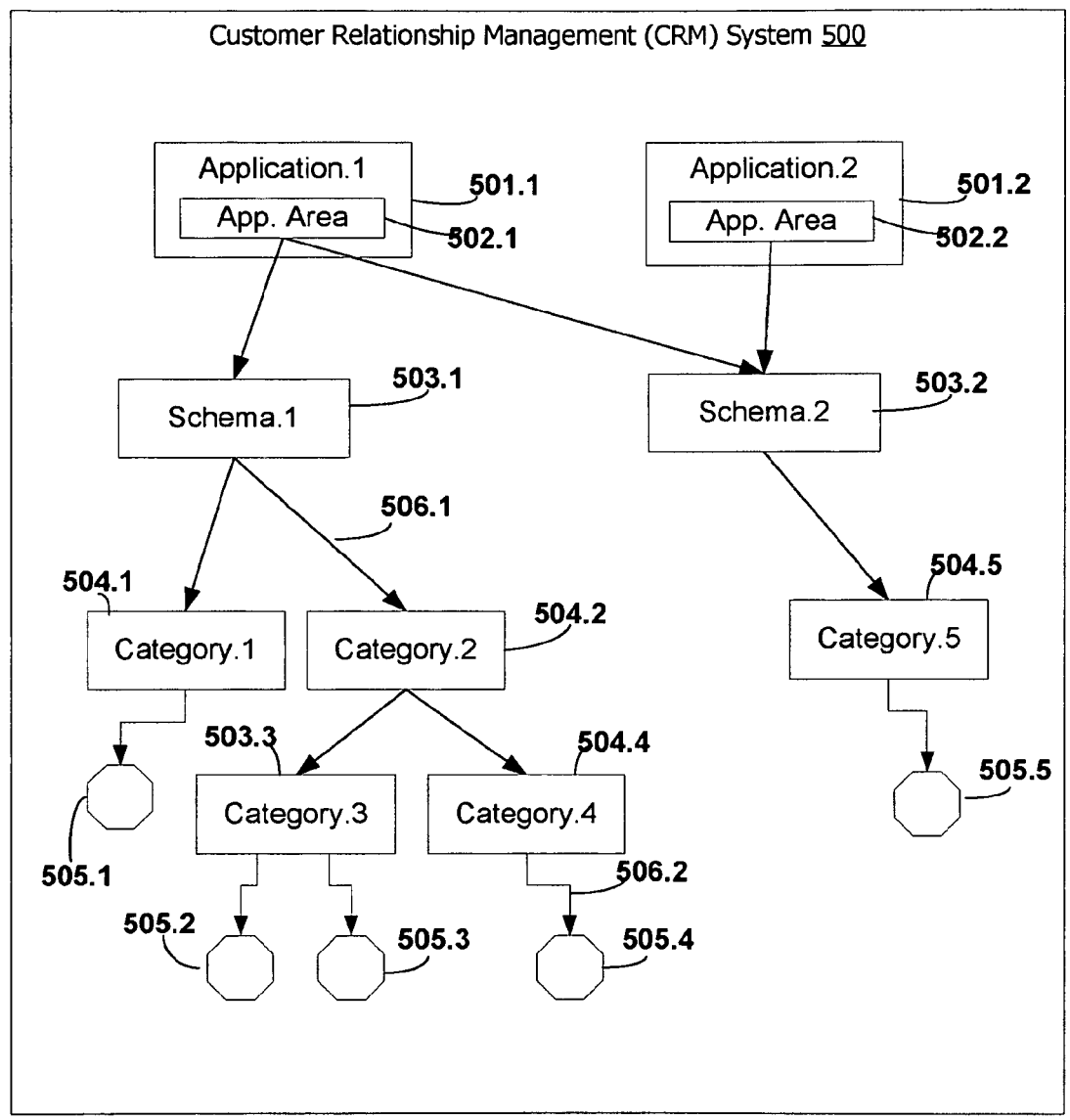
FIG. 5 illustrates an embodiment of a schema and the relationship schemas have to software applications.

FIG. 5 illustrates an embodiment of a schema and the relationship schemas have to software applications. A customer relationship management system (CRM) 500 is a software system that includes multiple software applications, e.g. billing, and often has shared data between the software applications. The CRM 500 system illustrated includes two software applications, application.1 501.1 and application.2 501.2. Applications 501 could be billing software, email programs, a policy manager application, a database application, etc. Each application 501 may include an application area 502 that may include a set of references to schemas 503 that are used by the application 501. As illustrated, application.1 501.1 has application area 502.1 that includes references to the schemas 503 that application.1 501.1 uses. For example, application.1 501.1 may use a schema 503 for determining the payment category and also a schema 503 for determining the type of treatment. As illustrated, application.1 501.1 uses schema.1 503.1 and uses schema.2 503.2. Application.2 501.2 has application area 502.2 that includes a reference to schema.2 503.2, which indicates that application.2 501.2 uses schema.2 503.2, but does not use schema.1 503.1. A schema 503 could be assigned to an application 501 by placing a reference to the schema 503 in the application area 502.

Continuing with FIG. 5, two schemas: schema.1 503.1 and schema.2 503.2 are illustrated. A schema 503 may be a hierarchy of categories 504 of arbitrary depth. A schema 503 may be assigned to an application by placing a reference to the schema 503 in the application area 502. A category 504 is a hierarchy node in a schema 503. The objects 505 may be business objects of a customer relationship management system. A category 504 may be restricted to the number of objects 505 that it can be linked with. For example, category 3 503.3 has two links to object 505.2 and object 505.3, but category 4 504.4 may be limited to only be permitted to link to a single object 505.4.

Figure 6:
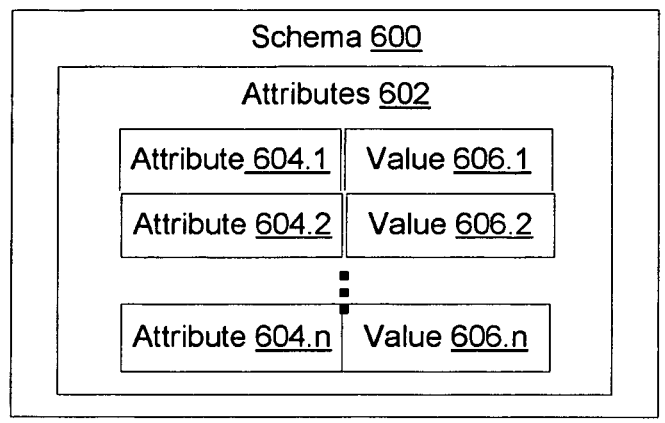
FIG. 6 illustrates a schema according to an embodiment of the present invention.

FIG. 6 illustrates a schema according to an embodiment of the present invention. The schema 600 may have attributes 602. The attributes 602 may be pairs of attribute 604 and value 606. For example, attribute 604.1 may be "ID" and the value 606.1 may be "Schema_1". The "ID" may be a means of identifying the schema within the CRM system. As another example, the attribute 604.2 may be "Changed on" and the value 606.2 may be "Jul. 17, 2007." The "Changed on" may be the date of the last time the schema was changed. A schema 600 may also have references to categories (not illustrated.)

Figure 7:
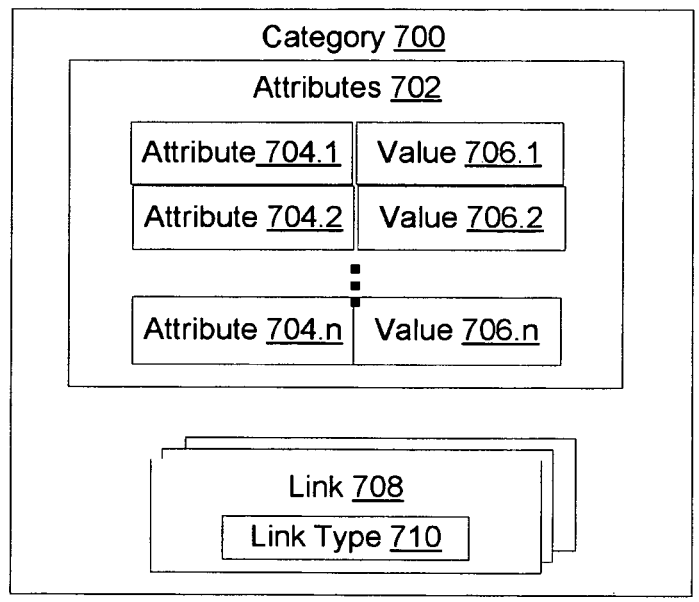
FIG. 7 illustrates a category according to an embodiment of the present invention.

FIG. 7 illustrates a category according to an embodiment of the present invention. A category 700 may have attributes 702. The attributes 702 may be pairs of attribute 704 and value 706. For example, attribute 704.1 may be "Label" and value 704.1 may be "Category_1". The "Label" may be a text string to represent the category 700. A category 700 may also have links 708. The link 708 may be a link to an object. The link 708 also includes a link type 710. The link type 710 determines whether the link 708 from the category 700 to an object permits multiple assignments of objects or only a single assignment of an object to the link 708. Link 708 may inherit a link type 710 from a parent category 700. A category 700 may also have a reference to other categories 700 (not illustrated).

Figure 8:
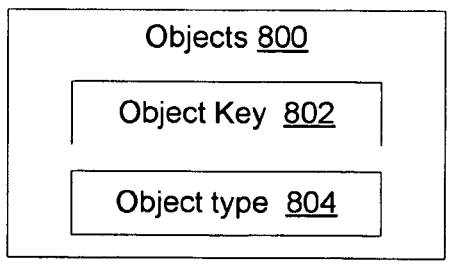
FIG. 8 illustrates an object according to an embodiment of the present invention.

FIG. 8 illustrates an object according to an embodiment of the present invention. An object 800 may be a business object of a CRM system and may be represented by an object key 802 and a object-type 804. The object key 802 may be a database-key transformed into characters. An object-type 804 may be the type of the object 800, e.g. an email, word-processing file, etc.

An Embodiment for Merging within a Customer Relationship Management System

Figure 9:
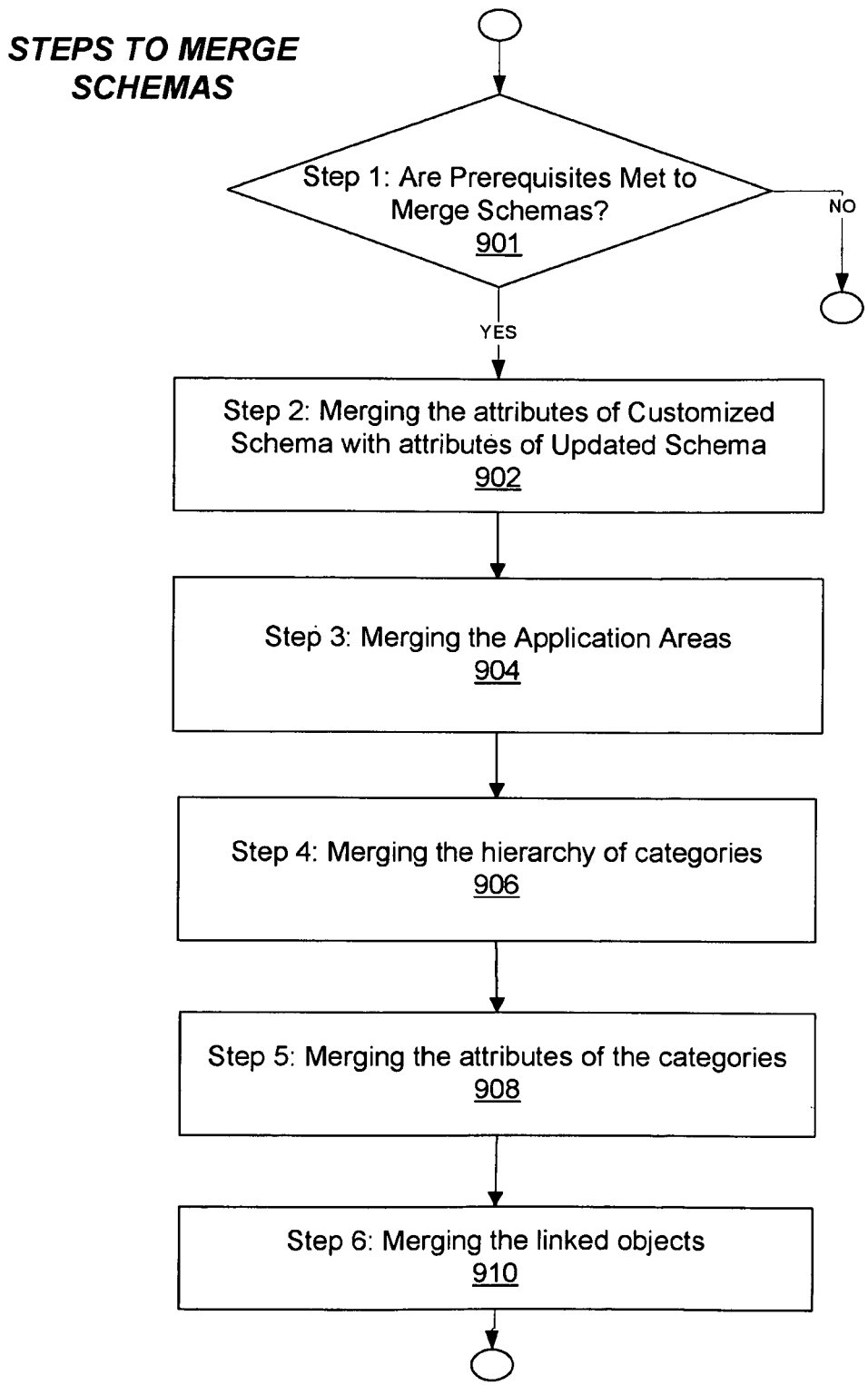
FIG. 9 illustrates an over-view of an embodiment of the present invention for merging two schemas.

FIG. 9 illustrates an over-view of an embodiment of the present invention for merging two schemas. One schema is designated the updated schema and the other schema is designated the customized schema. The customized schema is merged into the structure of the updated schema to produce a merged schema. Often, the updated schema is the schema that has been updated by the service provider 401 (FIG. 4) and the customized schema is the schema that has been customized by the customer 403 (FIG. 4). The flow begins at 901 with Step 1: checking if prerequisites are met before proceeding with the merger. The flow continues at 902 with Step 2: merging the attributes of customized schema with attributes of updated schema. The flow continues at 904 with Step 3: merging the application areas. The flow continues at 906 with Step 4: merging the hierarchy of categories. The flow continues at 908 with Step 5: merging the attributes of the categories 908. The flow continues at 910 with Step 5: merging the linked objects. Each step of the method will be discussed in greater detail below.

At step 1, are prerequisites met to merge the schemas. An example of prerequisites is the method may require that the schemas to be merged are: (1) consistent (free of errors); (2) have the same subject profile in the attributes of the schemas; and (3) have the same logical structure (hierarchical and attributive schemas must not be mixed by merger). If the prerequisites are not met then the method may end. In an embodiment, the method may include prompting a user for correcting the inconsistencies and/or automatically correcting the inconsistencies.

Figure 10:
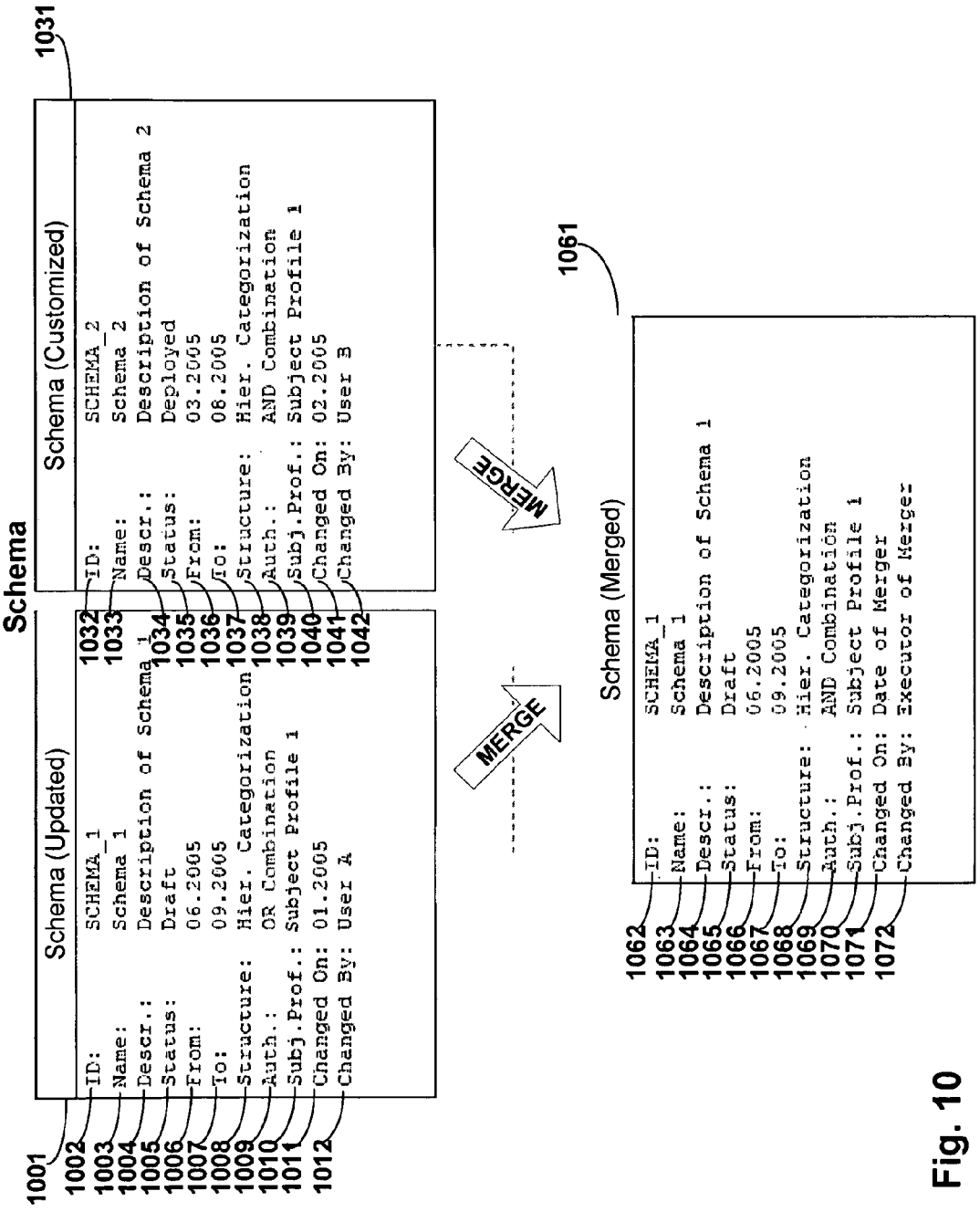
FIG. 10 illustrates a merge of the attributes of two schemas according to an embodiment of the present invention.

Step 2, merging the attributes of the customized schema with attributes of the updated schema. FIG. 10 illustrates a merge of the attributes of two schemas according to an embodiment of the present invention. The schemas being merged may have the following attributes: "ID", "Name", "Description", "Status", "Valid from", "Valid to", "Structure", "Authorization", "Subject Profile", "Changed on" and "Changed by". The merger may have rules whereby the "ID", "Name", "Description", "Valid from" and "Valid to" attributes are taken from the updated schema. As shown in FIG. 10, the updated schema 1001 is merged with the customized schema 1031 to form merged schema 1061. The "ID" attribute 1002 of updated schema 1001 is "SCHEMA_1" and the "ID" attribute 1032 of customized schema 1031 is "SCHEMA_2". The merged schema 1061 uses the "ID" attribute of the updated schema and sets its own "ID" attribute 1062 to "SCHEMA_1". Similarly, the values of the attributes "Name" 1003, "Description" 1004, "Status" 1005, "Valid from" 1006 and "Valid to" 1007 of the updated schema are used for the attributes "Name" 1063, "Description" 1064, "Status" 1065, "Valid from" 1066 and "Valid to" 1067 in the merged schema 1061. The attributes "Changed on" 1071 and "Changed by" 1072 may be set according to the merger rules, and not taken from either the "Changed on" 1011 or "Changed by" 1012 attributes of the updated schema or the "Changed on" 1041 or "Changed by" 1042 attributes of the customized schema.

Continuing to refer to FIG. 10, the merger rules may require the "Authorization" 1069 attribute of the merged schema 1061 to be set to the more restrictive of either the "Authorization" 1009 attribute of the leading schema 1001 or the "Authorization" 1039 of the customized schema 1031. Because the "AND Combination" value in the "Authorization" 1039 attribute of the customized schema 1031 is more restrictive than the "OR Combination" value in the "Authorization" 1009 attribute of the updated schema 1001, the merged schema "Authorization" 1069 attribute is set to "AND Combination". As discussed above for step 1, certain prerequisites may be necessary before a merger can proceed. These prerequisites might include a requirement that the logical structures be identical and the subject profiles also be identical for the schemas being merged. Because these attributes have to be the same between the schemas being merged, there is no dispute between value of the "Structure" 1008 attribute of the updated schema 1001 and the value of the "Structure" 1038 attribute of the customized schema 1031, and also no dispute between the value of the "Subject Profile" 1010 attribute of the updated schema and the value of the "Subject Profile" 1040 of the customized schema. Accordingly, the merged schema sets the "Structure" 1068 attribute to the same value of "Hier. Categorization" and sets the "Subject Profile" 1070 attribute to the same value of "Subject Profile 1".

Figure 11:
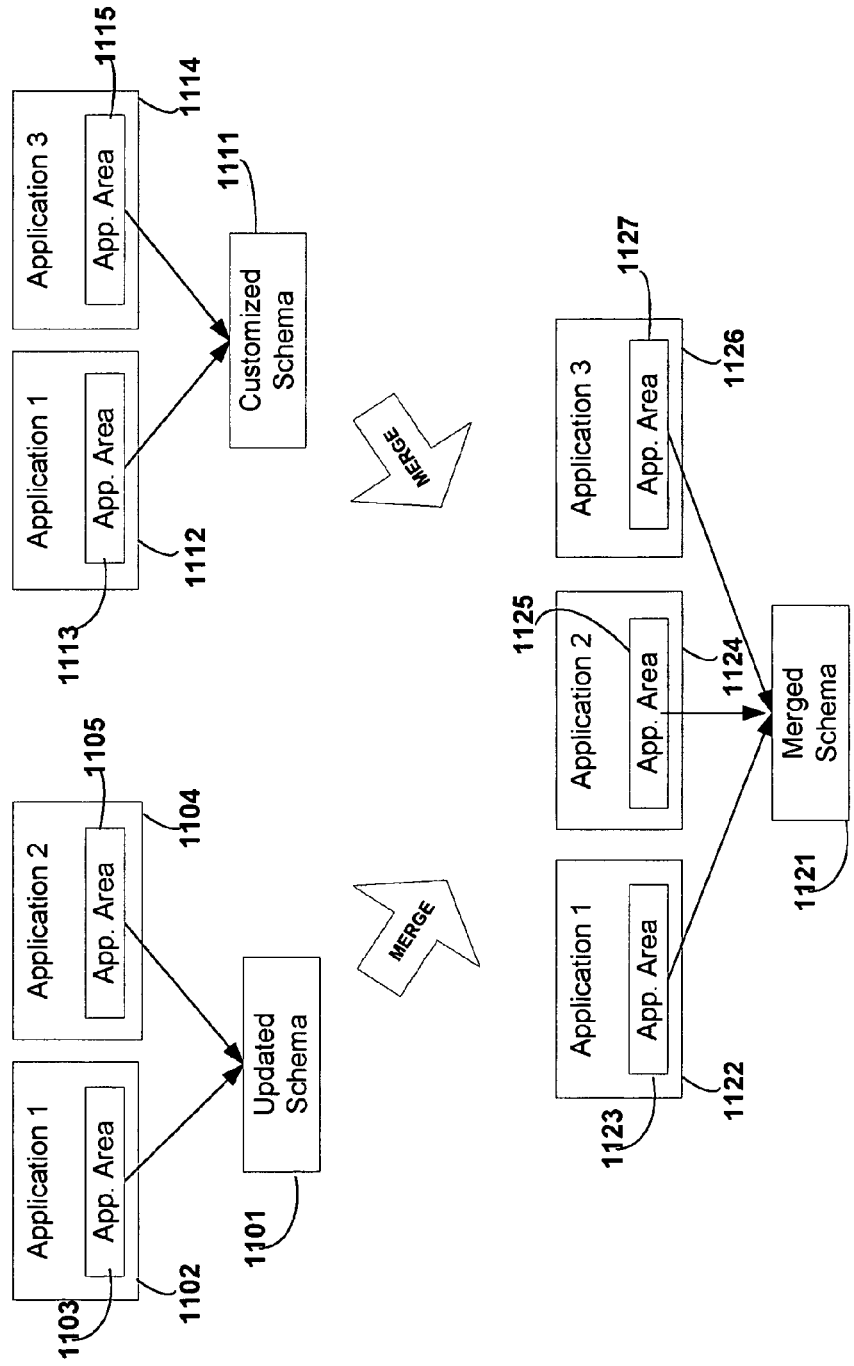
FIG. 11 illustrates a merge of the application areas referencing two schemas according to an embodiment of the present invention.

Step 3: merging the application areas. FIG. 11 illustrates a merge of the application areas referencing two schemas according to an embodiment of the present invention. The application areas referencing the schemas may be merged additively. If the same application area references both schemas being merged, a single reference in the application is made to the merged schema. If an application area references only one of the schemas being merged and not the other, the application area references the merged schema also. As discussed in step 1, a prerequisite for merging may require that the subject profile of the schemas being merged be the same. As shown in FIG. 11, the application areas referencing the updated schema 1101 and the application areas referencing the customized schema 1111 are updated to reference the merged schema 1121. The application area 1103 of "Application 1" 1102 references the updated schema 1101 and application area 1113 of "Application 1" 1112 references customized schema 1111, resulting in a single application area 1123 of "Application 1" 1122 being referencing merged schema 1121. The application area 1105 of "Application 2" 1104 references the updated schema 1101, but does not reference the customized schema 1111, resulting in the application area 1125 of "Application 2" 1124 referencing the merged schema 1121. The application area 1115 of "Application 3" 1114 references the customized schema 1111, but does not reference the updated schema 1101, resulting in the application area "Application 3" 1126 referencing the merged schema 1121.

Figure 12:
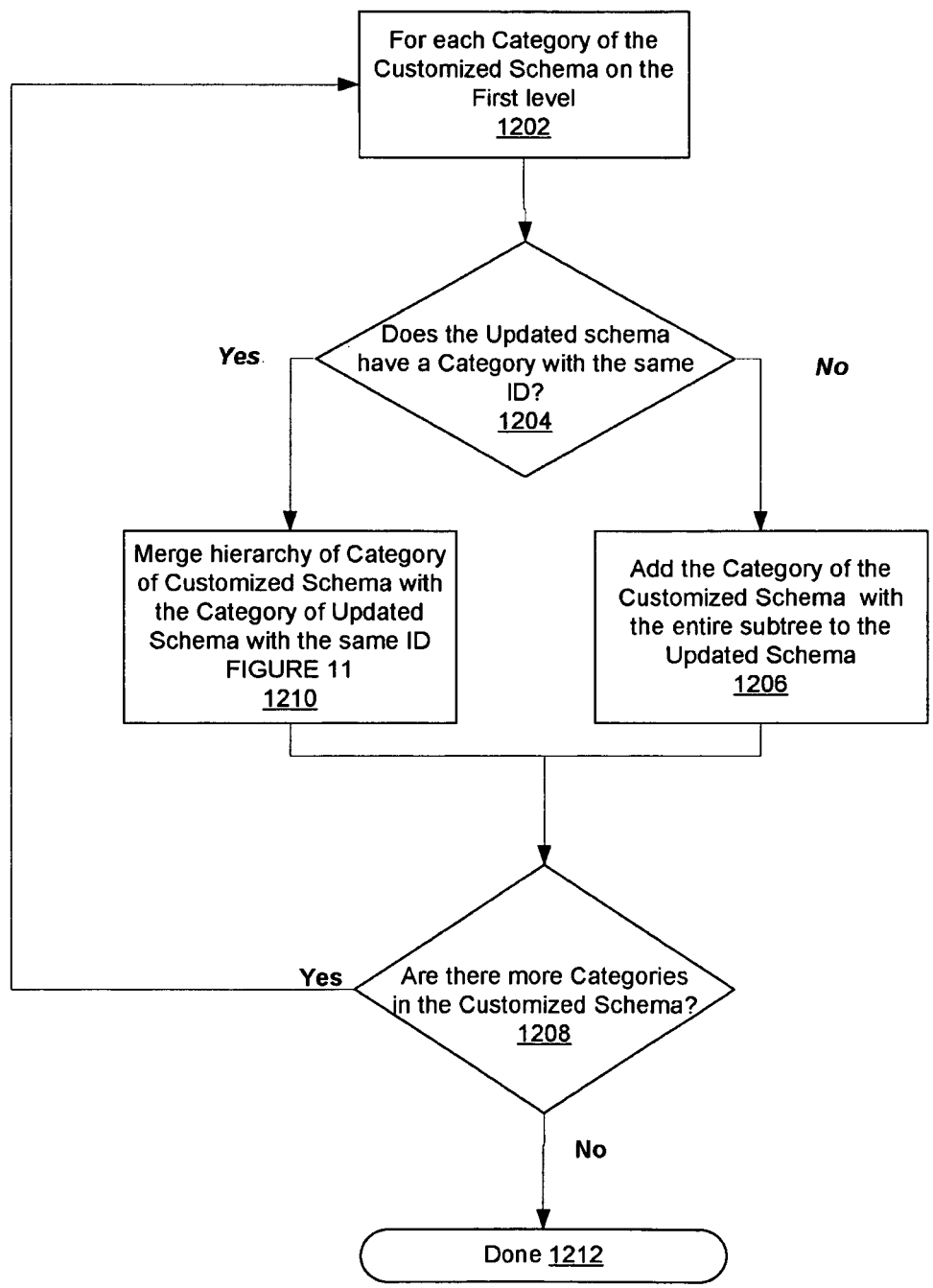
FIG. 12 illustrates a method for merging a hierarchy of categories of an updated schema with a hierarchy of categories of a customized schema to produce a hierarchy of categories of a merged schema according to an embodiment of the present invention.
Figure 13:
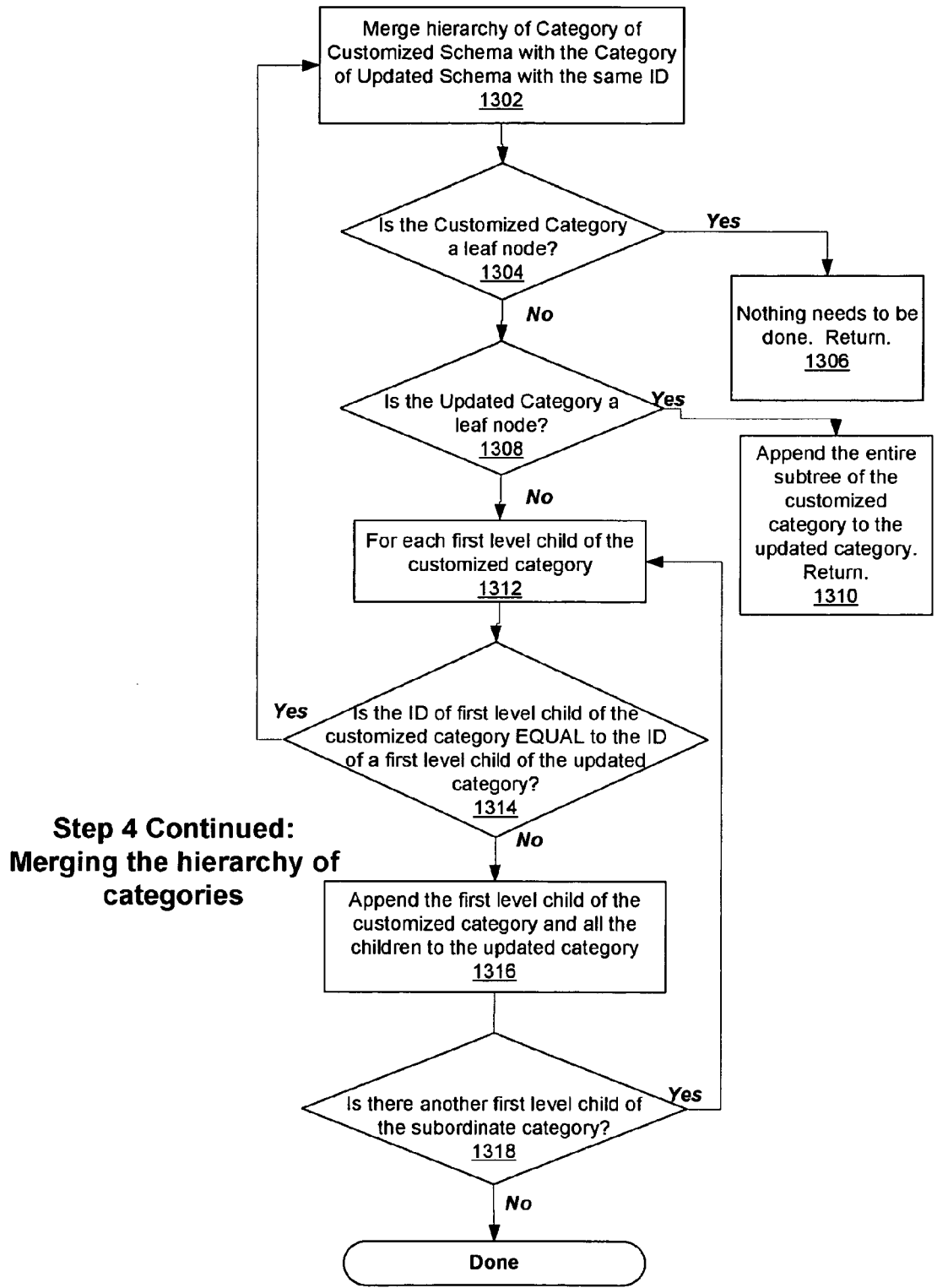
FIG. 13 illustrates a method for merging a hierarchy of categories of an updated schema with a hierarchy of categories of a customized schema to produce a hierarchy of categories of a merged schema according to an embodiment of the present invention.

Step 4: Merging the hierarchy of categories. FIG. 12 and FIG. 13 illustrate a method for merging a hierarchy of categories of a updated schema with a hierarchy of categories of a customized schema to produce a hierarchy of categories of a merged schema. In an embodiment, there a set of rules governs how the schema should be merged. The method of FIG. 12 and FIG. 13 is consistent with the following rules: (1) The customized schema is merged with the updated schema additively. So, the entire updated schema is included in the merged schema. (2) Each path from the root to a category in both the updated and customized schema is the same in the merged schema. And, (3) Identical paths in the customized and the updated schema are merged into one path in the merged schema.

Figure 14:
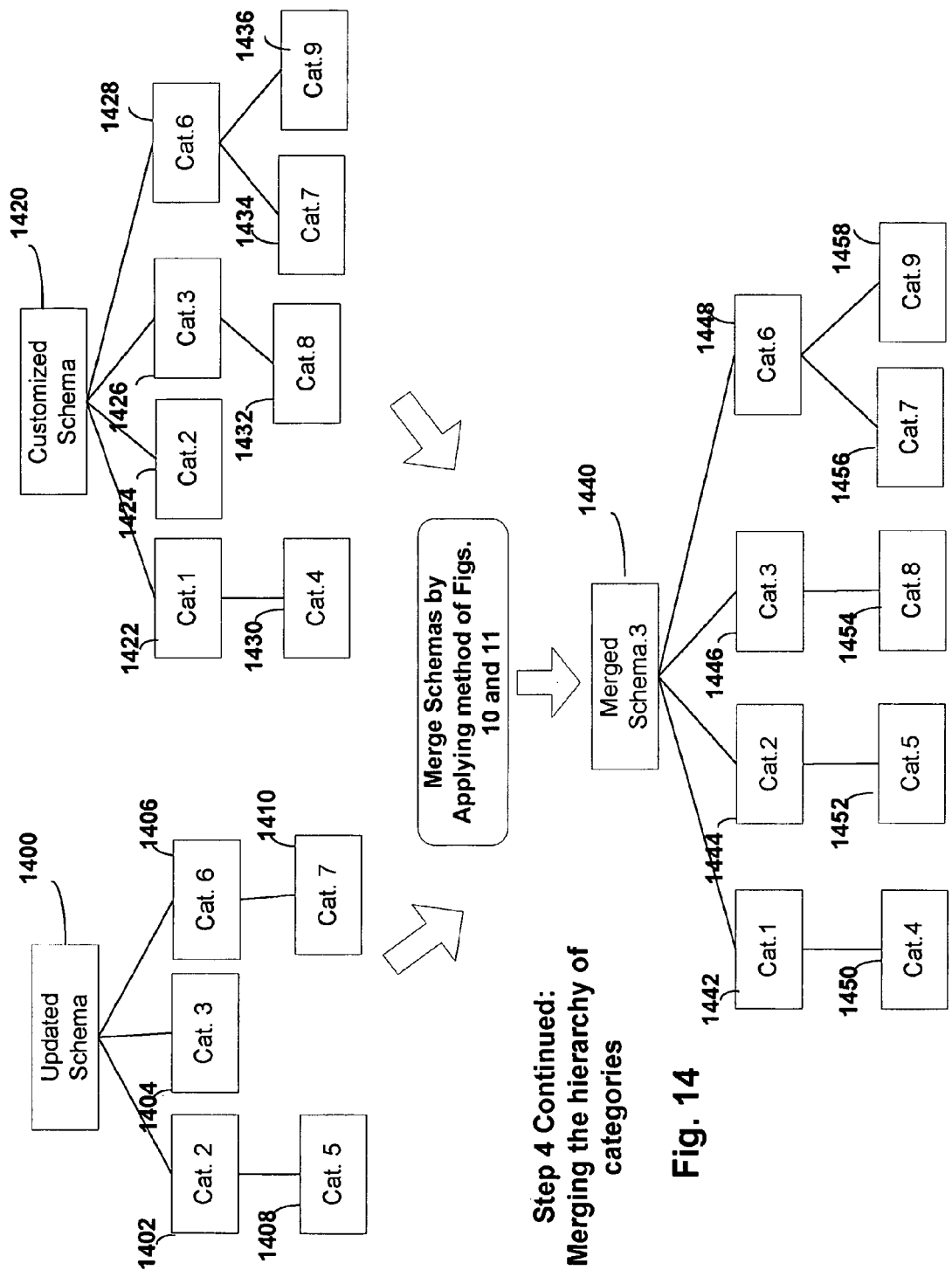
FIG. 14 illustrates an example for merging a hierarchy of categories of an updated schema with a hierarchy of categories of a customized schema to produce a hierarchy of categories of a merged schema according to an embodiment of the present invention.

FIG. 14 illustrates the operation of the method of FIG. 12 and FIG. 13 to merge two schemas. The customized schema 1420 is merged into the updated schema 1400. Referring to FIGS. 12, 13, 14, the flow begins at 1202 with for each category of the customized schema 1420 on the first level. The following categories are on the first level of the customized schema 1420, cat. 1 1422, cat. 2 1424, cat. 3 1426, and cat. 6 1428. The first category to consider is cat. 1 1422. The flow continues at 1204 with does the updated schema 1400 have a category with the same ID? Or, does the updated schema 1400 have a category with the ID cat 1? By examining FIG. 14, the answer is no. The flow continues at 1206 with add the category (cat 1 1422) of the customized schema 1420 with the entire sub-tree (cat 1 1422 has sub-tree cat 4 1430) to the merged schema 1440. So, cat 1 1422 is added to the merged schema 1440. The flow continues at 1208 with are there more categories in customized schema 1420? The answer is yes, so the flow returns to 1202 with for each category. The next category of the customized schema 1420 to examine is cat. 2 1424. The flow continues at 1204 with does the updated schema 1400 have a category with the same ID? Here, the answer is yes, since cat. 2 1424 has the same ID as cat. 2 1402. So, the flow continues to 1210 with merge hierarchy of category (cat. 2 1424) with the category (cat. 2 1402) of updated schema 1400 according to FIG. 13. So, the flow continues in FIG. 13 at 1302 with merge hierarchy of category (cat. 2 1424) of customized schema 1420 with the category (cat. 2 1402) of updated schema 1402 with the same ID (both are cat. 2). The flow continues at 1304 with is the customized category (cat. 2 1424) a leaf node? Here, cat. 2 1424 is a leaf node since it has no children. So, the flow continues to 1306 with nothing needs to be done, return. So, the method is done merging this category (cat. 2 1424). The flow returns to 1210 and then to 1208 with are there more categories in the customized schema 1420? The answer is yes, and the next category to consider is cat. 3 1426. So, the flow continues back to 1202, and then the flow continues to 1204 with does the updated schema 1400 have a category (cat. 3 1426) with the same ID? The answer is yes, cat. 3 1404 So, the flow continues to FIG. 13 at 1304 with is the customized category (cat. 3 1426) a leaf node? The answer this time is no. So, the flow continues at 1308 with is the updated category (cat. 3 1404) a leaf node? The answer is yes, as cat. 3 1404 has no children. The flow continues at 1310 with append the entire sub-tree of the customized category (cat. 3 1426) to the updated category (cat. 3 1404). So, as can be seen in the merged schema 1440 cat. 8 1454 is added to the merged schema 1440. The flow then returns to FIG. 10 at 1210. The flow continues at 1208 with are there more categories? Cat. 6 1428 is remaining, so the answer is yes. The flow continues at 1202 with for each category. The flow continues at 1204 with does the updated schema (1400) have a category with the same ID? The answer is yes, since cat. 6 1428 and cat. 6 1406 have the same ID. So, again, the flow continues to FIG. 13 at 1302, and as can easily be followed the flow continues at 1312 with for each category (there are two: cat. 7 1434 and cat. 9 1436) of the customized schema 1420. The flow continues at 1314 with is the ID of first level child of the customized category (cat. 7 1434) EQUAL to the ID of a first level child of the updated category (cat. 7

1410)? The answer is yes as both are cat. 7. So, the two cat. 7's (1410, 1434) have to be merged again with the method of FIG. 13. The flow continues at 1304 with is the customized category (1420) a leaf category? Here the answer is yes, that cat. 7 1434 is a leaf node. So, the flow returns to 1314 (from a recursive call to FIG. 13). The flow then continues at 1208. The last category of the customized schema cat. 9 1436 needs to be merged into the merged schema 1440. In a similar fashion as above, the flow continues through to 1314 with is the ID the same as an ID on the updated schema 1400. The answer is no, since there is no cat. 9 in the updated schema 1400. The flow continues at 1318 with is there another first level child of the customized category? The answer is no as cat. 9 1436 is the last child of cat. 6 1428. The flow returns at 1208 with are there more categories in the customized schema? The answer is no. All the categories have been merged. The flow proceeds to done 1212. As can be seen in FIG. 14, the merged schema 1440 is now complete.

Figure 15:
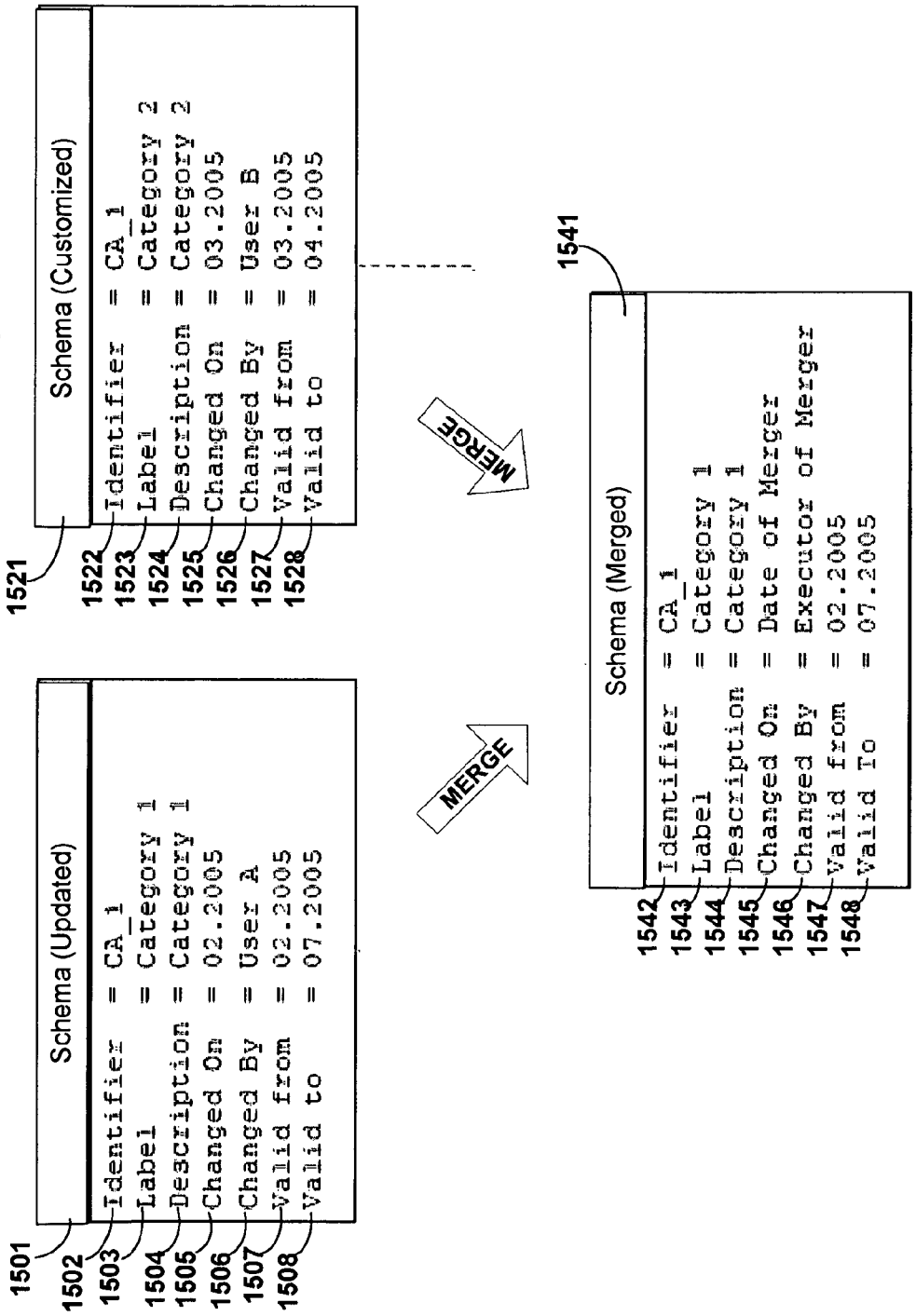
FIG. 15 illustrates an example merge of the attributes of the categories of two schemas according to an embodiment of the present invention.

Step 5: Merging the attributes of the categories. FIG. 15 illustrates an example merge of the attributes of the categories of two schemas according to an embodiment of the present invention. The categories being merged may have the following attributes: "Identifier", "Label", "Description", "Changed On", "Changed By", "Valid from" and "Valid to". The merger may have rules whereby the "Label", "Description", "Valid from" and "Valid to" attributes are taken from the updated of the merger. There may also be a prerequisite that the "Identifier" fields of the categories have to match if two categories are to be merged. Hence, there would be no dispute among the "Identifier" fields between the categories being merged. The fields "Changed On" and "Changed By" may be set by the merger rules itself, where "Changed On" is set to the date the merger took place and "Changed By" is set to the user ID of the person who initiated the merger.

Continuing to refer to FIG. 15, the category of the updated schema 1501 is merged with the category 1521 of the customized schema 1521 to form the merged category of the merged schema 1541. The "Identifier" attribute of category 1502 of the updated schema 1501 is "CA_1" and the "Identifier" attribute of category 1521 of the customized schema 1521 is "CA_1". Because a prerequisite may require that the "Identifier" attributes of the categories have to match, there is no dispute here between the "Identifier" attributes and the "Identifier" attribute of the category 1542 of the merged schema 1541 is set to "CA_1". The merger may have rules whereby the values of the "Label" attribute 1503, "Description" attribute 1504, "Valid from" attribute 1507 and "Valid to" attribute 1508 are taken from the category 1501 of the updated schema 1501 and used for the attributes of the categories of the merged schema 1541. Thus, for category of the merged schema 1541, the "Label" attribute 1543 is set to "Category 1", the "Description" attribute 1544 is set to "Category 1", the "Valid from" attribute 1547 is set to "02.2005" and the "Valid to" attribute 1548 is set to "07.2005", which matches the values from category 1501 of the updated schema 1501. The "Changed On" attribute 1545 may be set by the merger rules to the date the merger took place. The "Changed By" attribute 1546 may be set to by the merger rules to the user ID of the person who initiated the merger.

Figure 16:
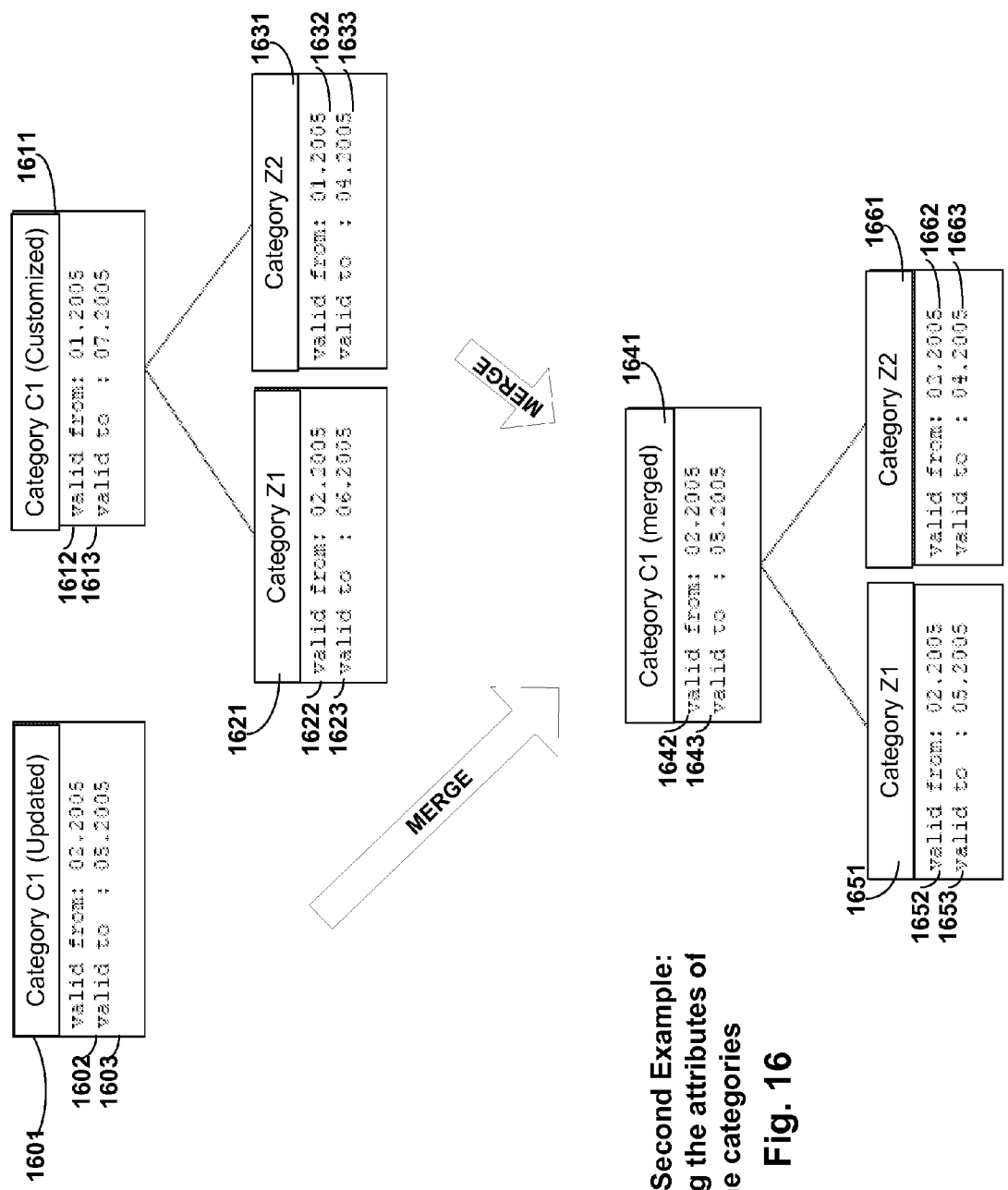
FIG. 16 illustrates a second example of merging the attributes of the categories of two schemas where the attributes of the children of a merged category are changed according to an embodiment of the present invention.

Step 5: Second Example: Merging the attributes of the categories. FIG. 16 illustrates a second example of merging the attributes of the categories of two schemas where the attributes of the children of a merged category are changed according to an embodiment of the present invention. In FIG. 16, the result of the merger necessitates the attributes of children of the merged category to have their attributes changed. Category C1 1601 of the updated schema is merged with category C1 1611 of the customized schema to form category C1 1641 of the merged schema. The category C1 1601 of the updated schema may have a "valid from" attribute 1602 with a value of "02.2005" and a "valid to" attribute 1603 with a value of "05.2005". The category C1 1611 of the customized schema may have a "valid from" attribute 1612 with a value of "01.2005" and a "valid to" attribute 1613 with a value of "07.2005". The merger rules may use the values from the category of the updated schema and may set the "valid from" 1642 attribute of the category C1 1641 of the merged schema to "02.2005" to match the value of the "valid from" 1602 attribute of the category C1 1601 of the updated schema. The merger rules may also set the "valid to" 1643 attribute of the category C1 1641 of the merged schema to "05.2005" to match the value of the "valid to" 1603 attribute of the category C1 1601 of the updated schema.

Continuing to refer to FIG. 16, the category C1 1641 of the merged schema may have two subcategories, a category Z1 1651 and a category Z2 1661. Changing the values of the attributes of category C1 1641 may affect the values of the attributes of the subcategories Z1 1651 and Z2 1661. The values of the attributes of a subcategory may depend on the values of the attributes of the category from which the subcategory depends from. For example, there may be no category Z1 and no category Z2 in the updated schema 1601 of two schemas being merged. Category Z1 1621 and category Z2 1631 may exist in a customized schema 1611, which would result in a category Z1 1651 and a category Z2 1661 in the merged schema. The values of the attributes of category Z1 1651 and category Z2 1661 may depend on the values of the attributes of their direct parent category C1 1641. The values may be set to the more restrictive of either the value from the result of the merger or the value of the parent category. The value of the "valid from" attribute 1622 from the category Z1 1621 prior to the merger is "02.2005" and the value of the "valid from" attribute 1642 of the parent category C1 1641 is "02.2005" so there is no conflict, and the "valid from" attribute 1652 of category Z1 1651 of the merged schema is set to "02.2005" accordingly. The value of the "valid to" attribute 1623 of the category Z1 1621 prior to the merger is "06.2005" and the value of the "valid to" attribute 1643 of the parent category C1 1641 of the merged schema is "05.2005", resulting in the "valid to" attribute 1653 set to the more restrictive "05.2005" value. An earlier ending date is more restrictive than a later ending date. Similarly, the "valid from" 1662 attribute of the category Z2 1661 of the merged schema is set to "02.2005" because this is the more restrictive of the values between the "valid from" attribute 1642 value of "02.2005" of the parent category C1 1641 and the "valid from" attribute 1632 value of "01.2005" of the category Z2 1631 of the customized schema prior to the merger. A later beginning date is more restrictive than an earlier beginning date. Likewise, the "valid to" 1663 attribute of the category Z2 1661 of the merged schema is set to "04.2005" because this is the more restrictive of the values between the "valid to" attribute 1643 value of "05.2005" of the parent category C1 1641 and the "valid to" attribute 1433 value of "04.2005" of the category Z2 1431 of the customized schema prior to the merger.

Figure 17:
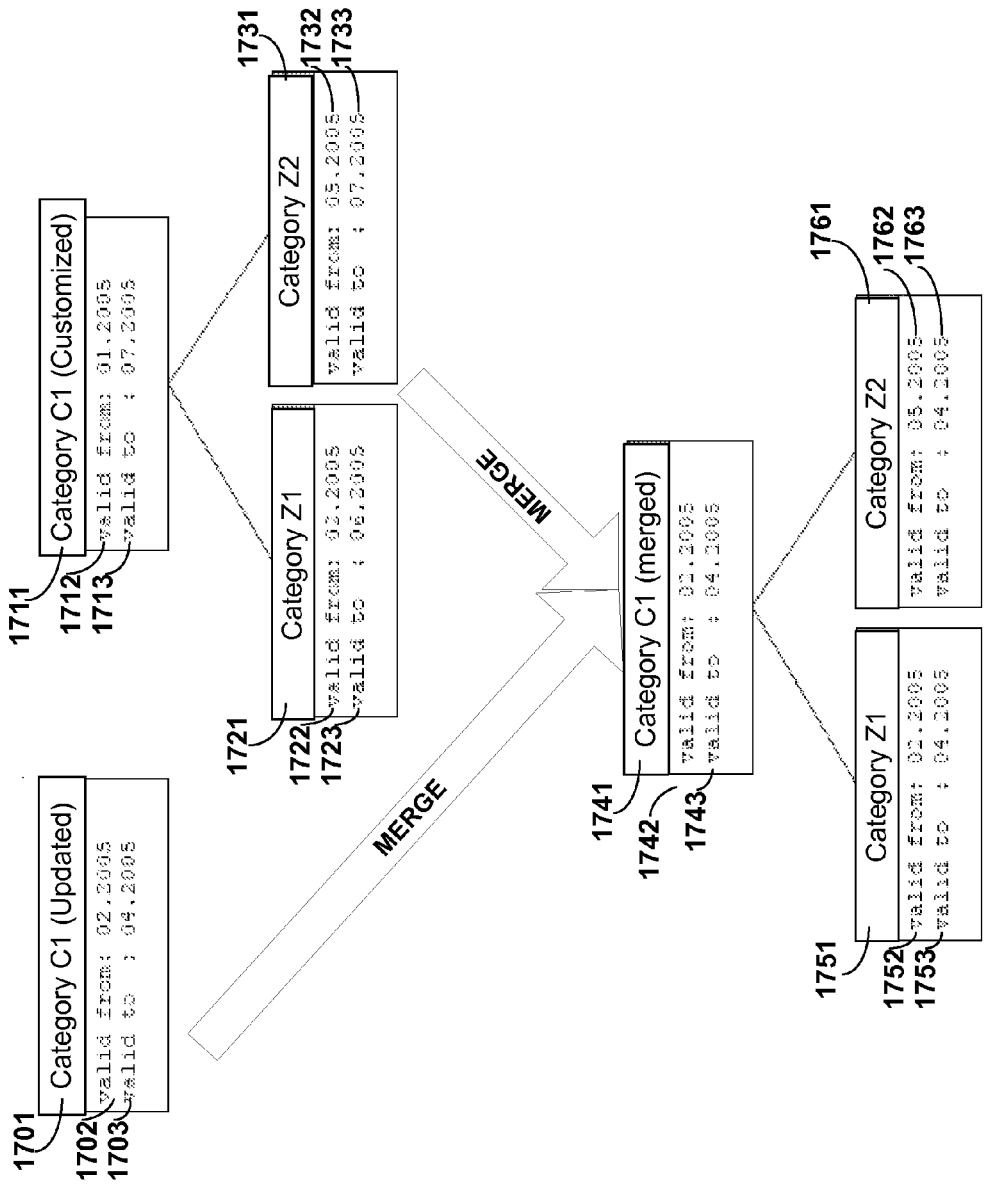
FIG. 17 illustrates a third example of merging the attributes of the categories of two schemas where the attributes of the children of a merged category are changed according to an embodiment of the present invention.

Step 5: Continuation: Merging the attributes of the categories. FIG. 17 illustrates a third example of merging the attributes of the categories of two schemas where the attributes of the children of a merged category are changed according to an embodiment of the present invention. Again, the values of the attributes of a subcategory may depend on the values of the attributes of the category from which the subcategory depends from. The values may be set to the more restrictive of either the value from the result of the merger or the value of the parent category. For category Z2 1761 of the merged schema, the "valid from" attribute 1762 would be set to the more restrictive value of either the "valid from" attribute 1742 of its parent category C1 1741, "02.2005", or the "valid from" attribute 1732 of category Z2 1731 of the customized schema prior to the merger, "05.2005". In this case, the "valid from" attribute 1762 of category Z2 1761 of the merged schema is set to "05.2005" because this value is more restrictive than "02.2005". Likewise, the "valid to" attribute 1763 of category Z2 1761 of the merged schema is set to the value "04.2005" because this is the more restrictive value of either the value of the "valid to" attribute 1743 of the parent category C1 1741, namely "04.2005", and the value of the "valid to" attribute 1733 of the category Z2 1731 of the customized schema prior to the merger, namely "07.2005". However, having a "valid from" value of "05.2005" and a "valid to" value of "04.2005" may create an inconsistency, because there may be a rule that a "valid from" value cannot be later than a "valid to" value, which would be violated here. In this case, the merger rules may have additional rules, setting one attribute to a default value, or a blank value, or a value to match the other attribute value. Alternatively, the system may prompt for user intervention to require a user to make a manual change. The results of the merger as well as any inconsistencies may be logged to a merger log to be processed later or to be reviewed at a later time.

Figure 18:
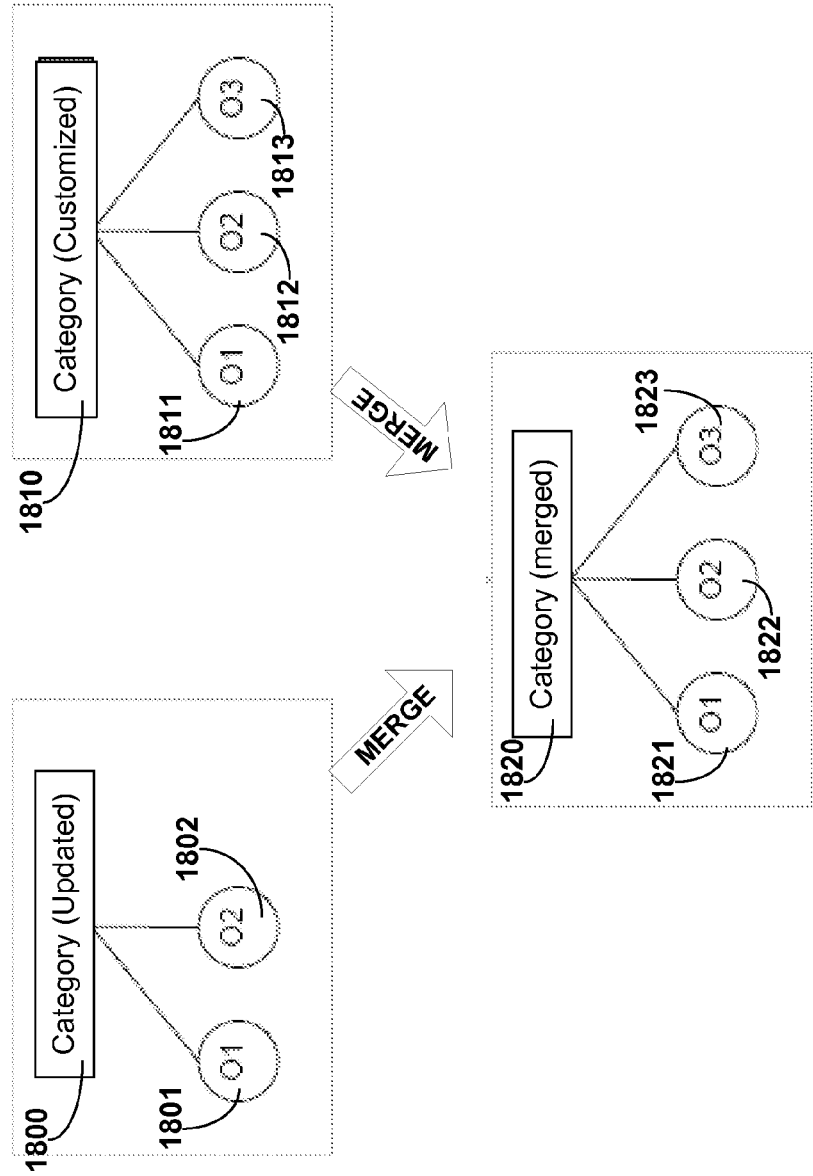
FIG. 18 illustrates merging the linked objects of two schemas consistent with the present invention.

Step 6: Merging the linked objects. FIG. 18 illustrates merging the linked objects of two schemas consistent with the present invention. As discussed above, if two categories are merged, then the objects linked to these categories are also merged. The actual merger of the linked objects may depend on the assignment type of the link 708 (FIG. 7). For example, if the link type 710 (FIG. 7) allows for multiple assignments, then every object that appears prior to the merger will appear after the merger is completed. In other words, every object that is linked to the category of the updated schema as well as every object that is linked to the category of the customized schema is linked to the merged category. If there is a link to the same object in both the category of the updated schema and the category of the customized schema, then the two links are merged into one link. However, if the link type 710 (FIG. 7) allows for only single assignments, and the linked objects differ in the category of the updated schema and the category of the customized schema, then the object link of the updated category may be used in the merged category. Again, the results of the merger may be recorded to a merger log.

Continuing to refer to FIG. 18, the updated category 1800 is merged with the customized category 1810 to form the merged category 1820. The updated category 1800 has two objects linked to it, namely object O1 1801 and object O2 1802. The customized category 1810 has three objects linked to it, namely object O1 1811, object O2 1812 and object O3 1813. All the link types involved here are multiple assignment links. Because both the updated category 1800 and the customized category 1810 contain a link to an object O1, the two links are merged into one link and we have a link to object O1 1821 in the merged category 1820. Similarly, because both the updated category 1800 and the customized category 1810 contain a link to object O2, the two links are also merged into one link and we have a link to object O2 1822 in the merged category 1820. There is no link to an object O3 in the updated category 1800, but there is a link to an object O3 1813 in the customized category 1810. This results in a link to an object O3 1823 in the merged category 1820.

Figure 19:
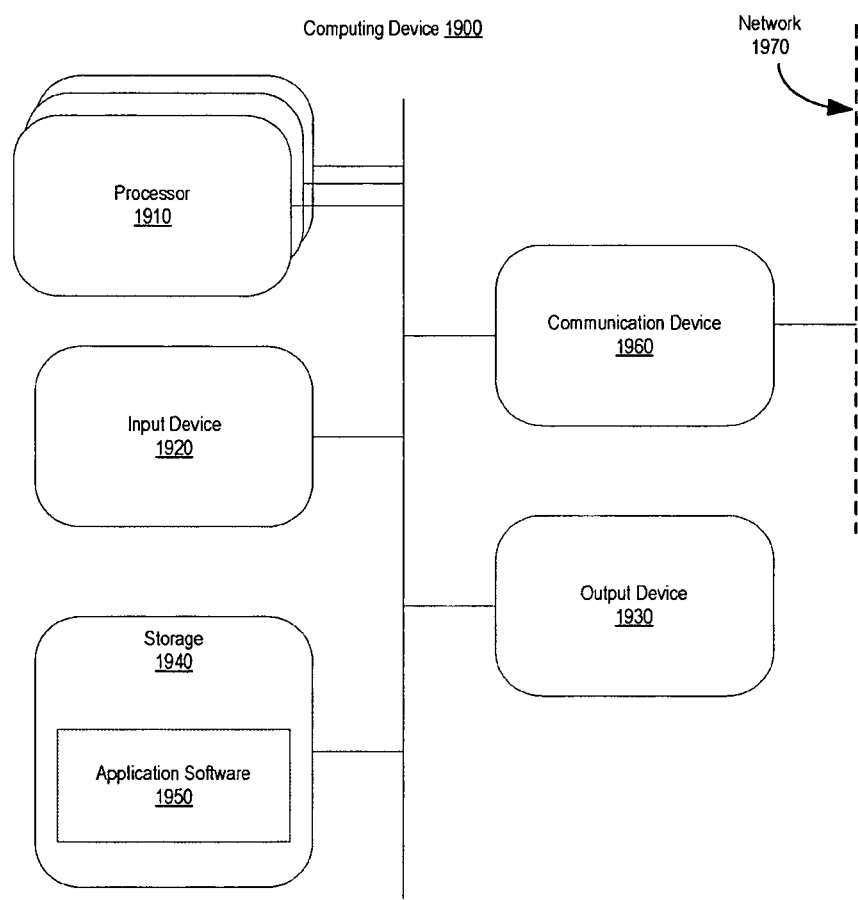
FIG. 19 illustrates a computer system according to an embodiment of the present invention.

FIG. 19 illustrates components of a basic computer in accordance with an embodiment of the present invention. FIG. 19 depicts computing device 1900, which may be a personal computer, workstation, handheld personal digital assistant ("PDA"), mainframe computer, mini-computer, database servers, enterprise servers, or any other type of computing-based device. Computing device 1900 may include one or more of processor 1910, input device 1920, output device 1930, storage 1940, and communication device 1960.

Input device 1920 may include a keyboard, mouse, pen-operated touch screen or monitor, voice-recognition device, or any other device that provides input. Output device 1930 may include a monitor, printer, disk drive, speakers, or any other device that provides output.

Storage 1940 may include volatile and nonvolatile data storage, including one or more electrical, magnetic or optical memories such as a RAM, cache, hard drive, CD-ROM drive, tape drive or removable storage disk. Communication device 1960 may include a modem, network interface card, or any other device capable of transmitting and receiving signals over a network. The components of computing device 1900 may be connected via an electrical bus or wirelessly.

Application software 1950, which may be stored in storage 1940 and executed by processor 1910, may include, for example, the customer relationship management software, and/or a merge module, and/or an editor for editing schemas. The application software may be implemented at least partially in hardware, e.g. ROMs, and/or special purpose hardware, e.g. a special purpose computing chip implementing the functionality of the application software. In an embodiment, application software embodying the functionality of the present invention may be implemented through a Web browser as a Web-based application or Web service.

User computing device 1900 may implement any operating system, such as Windows or UNIX. Application software 1950 may be written in a programming language, such as ABAP, C, C++, Java or Visual Basic.

The computing devices may communicate via a network 1970 via communication device 1960. The network 1970 may have network links that may include telephone lines, DSL, cable networks, T1 or T3 lines, wireless network connections, or any other arrangement that implements the transmission and reception of network signals. The network 1970 may include any type of interconnected communication system, which may implement any communications protocol, which may be secured by any security protocol, e.g. Internet, LAN, wireless, satellite, dedicated lines, etc.

One skilled in the art will recognize that the rules for merging the attributes of the categories and merging the linked objects are for an embodiment of the present invention. A service provider and/or customer may adapt these rules to suit their particular situation.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer method for merging a second schema into a first schema, wherein each schema is comprised of categories organized by a hierarchy, the hierarchy defining relationships between categories, the first schema is used as a decision tree by a customer relationship management ("CRM") application, and both schemas are used by a plurality of application programs each having an application area, and each application area including a reference to the schemas used by the corresponding application program, comprising:

responsive to receiving the first schema, comparing each path from a root of the hierarchy of the second schema with paths of the first schema and if a path does not have a corresponding path in the first schema, then adding the path to the first schema by adding those categories of the path of the second schema to the first schema that are not present in the first schema, and adding a reference to the first schema to each application area that contains a reference to the second schema.

2. The method of claim 1, further comprising:
finding inconsistencies where the second schema and the first schema cannot be merged;
prompting a user to make manual changes to correct the inconsistencies; and
completing the merging after the inconsistencies have been corrected.

3. The method of claim 1, further comprising:
logging results of the merging in a log.

4. The method of claim 1, further comprising:
a customer relationship management ("CRM") system application using the second schema as a decision tree;
importing the first schema into the CRM system; and
the CRM system application using the first schema as a decision tree.

5. The method of claim 1, the second schema having attributes and the first schema having attributes, and further comprising: merging the attributes of the second schema with the attributes of the first schema.

6. The method of claim 5, wherein each category has attributes having a value, further comprising:
if the value of an attribute of a category is constrained by a value of the attribute of a parent category of the category, and the category has a new parent category in the first schema, then setting the value of the attribute of the category to the more restrictive of the value from the first schema and the second schema or the value of the attribute of the parent category.

7. The method of claim 1, wherein comparing further comprises:
merging the categories of the second schema with the categories of the first schema that are present in the path, each category having a link with a link type, by:
linking every object that is linked to the category of the second schema to the category of the first schema if the link type of the category of the first schema is multiple;
otherwise not linking the objects of the category of the second schema.

8. A computer system configured to merge a first schema and a second schema to generate a third schema, wherein each schema is comprised of categories organized by a hierarchy, the hierarchy defining relationships between categories, the third schema is used as a decision tree by a customer relationship management ("CRM") application, and the three schemas are used by a plurality of application programs each having an application area, and each application area including a reference to the schemas used by the corresponding application program, comprising:
a processor configured to:
respond to receiving the first schema,
copy the first schema to generate the third schema,
compare each path from a root of the hierarchy of the second schema with paths of the third schema and if a path does not have a corresponding path in the third schema, then add the path to the third schema by adding those categories of the path of the second schema to the third schema that are not present in the third schema, and add a reference to the third schema to each application area that contains a reference to either the first schema or the second schema.

9. The computer system of claim 8, wherein the processor is further adapted to:
find inconsistencies where the second schema and the third schema cannot be merged;
prompt a user to make manual changes to correct the inconsistencies; and
complete the merging after the inconsistencies have been corrected.

10. The computer system of claim 8, wherein the processor is further adapted to:
log results of the merging in a log.

11. The computer system of claim 8, wherein the processor is further adapted to:
execute a customer relationship management ("CRM") system application to use the first schema as a decision tree;
import the second schema into the CRM system; and
execute the CRM system application to use the third schema as a decision tree.

12. The computer system of claim 8, the second schema having attributes and the first schema having attributes, and wherein the processor is further adapted to: merge the attributes of the second schema with the attributes of the first schema to produce the attributes of the third schema.

13. The computer system of claim 12, wherein each category has attributes having a value, and wherein the processor is further adapted to:
when values of the attributes of a category of the second schema conflict with the values of the attributes of a category of the first schema, then set the values of the attributes of the corresponding category of the third schema to the value of the attributes of the category of the first schema.

14. The computer system of claim 13, wherein the processor is further adapted to:
set the value of the attribute of the category to the more restrictive of the value from the result of the merger or the value of the attribute of the parent category if the value of an attribute of a category is constrained by a value of the attribute of a parent category of the category, and the category has a new parent category in the third schema.

15. The computer system of claim 8, wherein comparing further comprises:
merge the categories of the second schema with the categories of the third schema that are present in the path, each category having a link with a link type, by:
linking every object that is linked to the category of the second schema to the category of the third schema if the link type of the category of the third schema is multiple;
otherwise not linking the objects of the category of the second schema.

16. A computer method for merging a second schema into a first schema, wherein each schema is comprised of categories organized by a hierarchy, the hierarchy defining relationships between categories, the schemas used as a decision tree by a customer relationship management ("CRM") application, and both schemas are used by a plurality of application programs each having an application area, and each application area including a reference to the schemas used by the corresponding application program, comprising:
responsive to receiving the first schema;

iteratively for each category linked on a first hierarchical level of the second schema, each category having an identification (ID);

if the first schema does not have a category with the same ID as the category of the second schema, then add the category of the second schema with all of the children of the category of the second schema to the first schema;

else if the category of the first schema with the same ID is a leaf node then append each of the children of the category of the second schema to the category of the first schema;

else for each first level child of the category of the second schema recursively merge the child and the category of the first schema; and adding a reference to the first schema to each application area that contains a reference to the second schema.

17. A computer method for merging a second schema into a first schema, wherein each schema is comprised of categories organized by a hierarchy, the hierarchy defining relationships between categories, the schemas used as a decision tree by a customer relationship management ("CRM") application, and both schemas are used by a plurality of application programs each having an application area, and each application area including a reference to the schemas used by the corresponding application program, comprising:

responsive to receiving the first schema;

merging the categories of the second schema additively into the first schema, wherein each path from a root of the second schema to each category of the second schema is preserved in the first schema, and wherein paths with the same sequence of categories in the second schema and the first schema are merged into one path in the first schema, and adding a reference to the first schema to each application area that contains a reference to the second schema.

* * * * *